United States Patent
Fraser et al.

(10) Patent No.: US 10,760,831 B2
(45) Date of Patent: Sep. 1, 2020

(54) OIL DISTRIBUTION IN MULTIPLE-COMPRESSOR SYSTEMS UTILIZING VARIABLE SPEED

(71) Applicants: Bruce A. Fraser, Manlius, NY (US); Terry Nares, Syracuse, NY (US)

(72) Inventors: Bruce A. Fraser, Manlius, NY (US); Terry Nares, Syracuse, NY (US)

(73) Assignee: BITZER Kuehlmaschinenbau GmbH, Sindelfingen (DE)

( * ) Notice: Subject to any disclaimer, the term of this patent is extended or adjusted under 35 U.S.C. 154(b) by 677 days.

(21) Appl. No.: 15/004,276

(22) Filed: Jan. 22, 2016

(65) Prior Publication Data

US 2017/0211855 A1    Jul. 27, 2017

(51) Int. Cl.
*F25B 31/00*    (2006.01)
*F25B 49/02*    (2006.01)
(Continued)

(52) U.S. Cl.
CPC ........ *F25B 31/002* (2013.01); *F04B 39/0207* (2013.01); *F04B 41/06* (2013.01); *F04B 49/08* (2013.01); *F04B 49/20* (2013.01); *F25B 1/10* (2013.01); *F25B 31/004* (2013.01); *F25B 49/022* (2013.01); *F04C 23/00* (2013.01); *F25B 2400/0751* (2013.01); *F25B 2500/16* (2013.01); *F25B 2600/0253* (2013.01); *F25B 2700/1932* (2013.01); *Y02B 30/741* (2013.01)

(58) Field of Classification Search
CPC .... F25B 31/002; F25B 31/004; F25B 43/022; F25B 2400/075; F25B 2400/0751; F25B 2600/025; F25B 2700/03; F25B 2700/1932
See application file for complete search history.

(56) References Cited

U.S. PATENT DOCUMENTS 3,360,958 A    1/1968 Miner
3,386,262 A    6/1968 Hackbart et al.
(Continued)

FOREIGN PATENT DOCUMENTS

CN    1318145 A    10/2001
CN    1985091 A    6/2007
(Continued)

*Primary Examiner* — Elizabeth J Martin
(74) *Attorney, Agent, or Firm* — Reinhart Boerner Van Deuren P.C.

(57) ABSTRACT

A method of operating a multiple-compressor refrigeration system is provided. This method includes the steps of supplying, via a common supply line, refrigerant gas and oil to a plurality of compressors coupled in series, and attaching an oil flow conduit between adjacent compressors of the plurality of compressors. The oil flow conduit is configured to move oil from a compressor with a relatively higher pressure to a compressor with a relatively lower pressure. The method further includes controlling the pressure for each of the plurality of compressors by regulating a speed at which each of the plurality of compressors operates in order to maintain a pressure differential between the adjacent compressors to facilitate the flow of oil from the compressor with the relatively higher pressure to the compressor with the relatively lower pressure.

20 Claims, 4 Drawing Sheets

(51) Int. Cl.
  *F25B 1/10*   (2006.01)
  *F04B 41/06*  (2006.01)
  *F04B 39/02*  (2006.01)
  *F04B 49/08*  (2006.01)
  *F04B 49/20*  (2006.01)
  *F04C 23/00*  (2006.01)

(56) References Cited

U.S. PATENT DOCUMENTS

| | | | |
|---|---|---|---|
| 3,581,519 A | | 6/1971 | Garrett, Jr. et al. |
| 4,179,248 A | | 12/1979 | Shaw |
| 4,551,989 A | | 11/1985 | Lindahl et al. |
| 4,729,228 A | | 3/1988 | Johnsen |
| 5,094,598 A | | 3/1992 | Amata et al. |
| 5,996,363 A | * | 12/1999 | Kurachi .............. F04B 39/0207 |
| | | | 417/372 |
| 6,428,296 B1 | | 8/2002 | Elson et al. |
| 6,519,971 B1 | * | 2/2003 | Kim .................... F25B 43/006 |
| | | | 62/475 |
| 6,599,109 B2 | | 7/2003 | Zamudio et al. |
| 6,736,607 B2 | | 5/2004 | Ginies et al. |
| 6,983,622 B2 | | 1/2006 | DeBernardi et al. |
| 7,137,265 B2 | | 11/2006 | Kim |
| 7,316,291 B2 | | 1/2008 | Thomsen et al. |
| 7,421,850 B2 | | 9/2008 | Street et al. |
| 7,721,757 B2 | | 5/2010 | Ginies et al. |
| 8,079,830 B2 | | 12/2011 | Süss et al. |
| 8,337,183 B2 | | 12/2012 | Milliff et al. |
| 8,398,387 B2 | | 3/2013 | Shiotani et al. |
| 2001/0026766 A1 | | 10/2001 | Terai et al. |
| 2005/0229627 A1 | | 10/2005 | De Bernardi et al. |
| 2006/0059929 A1 | | 3/2006 | Sakitani et al. |
| 2007/0074534 A1 | | 4/2007 | Sato |
| 2008/0134701 A1 | * | 6/2008 | Christensen .......... F25B 31/002 |
| | | | 62/193 |
| 2009/0035168 A1 | | 2/2009 | Ginies et al. |
| 2009/0041602 A1 | | 2/2009 | Ginies et al. |
| 2009/0081062 A1 | | 3/2009 | Upadhye et al. |
| 2010/0092319 A1 | | 4/2010 | Duppert |
| 2010/0186433 A1 | | 7/2010 | Galante et al. |
| 2010/0186439 A1 | | 7/2010 | Ogata et al. |
| 2010/0202909 A1 | | 8/2010 | Shiotani et al. |
| 2011/0081254 A1 | | 4/2011 | Hafkemeyer et al. |
| 2012/0297818 A1 | | 11/2012 | Toyama et al. |
| 2013/0098100 A1 | | 4/2013 | Bonnefoi et al. |
| 2013/0255286 A1 | * | 10/2013 | Siegert ................. F25B 31/004 |
| | | | 62/84 |
| 2014/0037483 A1 | | 2/2014 | Fraser et al. |
| 2014/0037484 A1 | | 2/2014 | Fraser et al. |
| 2014/0056725 A1 | * | 2/2014 | Fraser ................. F04C 15/0088 |
| | | | 417/53 |
| 2015/0167660 A1 | * | 6/2015 | Crolius ................. F04B 49/007 |
| | | | 417/53 |

FOREIGN PATENT DOCUMENTS

| | | |
|---|---|---|
| CN | 101999064 A | 3/2011 |
| EP | 1120611 A1 | 8/2001 |
| EP | 1614983 A2 | 11/2006 |
| JP | 04287880 A | 10/1992 |
| JP | 05071811 A | 3/1993 |
| JP | H05272477 A | 10/1993 |
| JP | 07035045 A | 2/1995 |
| JP | H0829018 A | 2/1996 |
| JP | H0861809 A | 3/1996 |
| JP | 08128764 A | 5/1996 |
| JP | 2605498 B2 | 4/1997 |
| JP | 2001132645 A | 5/2001 |
| JP | 2005076515 A | 3/2005 |
| KR | 1020050065258 A | 6/2005 |
| WO | WO 97/16647 A1 | 5/1997 |
| WO | WO 2005/103492 A1 | 11/2005 |
| WO | WO 2008/081093 A2 | 7/2008 |
| WO | WO 2010/115435 A1 | 10/2010 |

\* cited by examiner

OIL DISTRIBUTION IN MULTIPLE-COMPRESSOR SYSTEMS UTILIZING VARIABLE SPEED

FIELD OF THE INVENTION

This invention generally relates to multiple-compressor systems and, more particularly, to oil distribution systems used in multiple-compressor systems.

BACKGROUND OF THE INVENTION

In a multiple-compressor system, such as a refrigeration system, one challenge is to maintain sufficient oil level in each of the compressors whether the compressor is running or not. Designing a system capable of moving equal amounts of oil to different compressors is difficult due to variations in the individual compressors and piping configurations to those compressors. A particular example of the state of the art with respect to suction gas distribution in a parallel compressor assembly is represented by WIPO patent publication WO2008/081093 (Device For Suction Gas Distribution In A Parallel Compressor Assembly, And Parallel Compressor Assembly), which shows a distribution device for suction gas in systems with two or more compressors, the teachings and disclosure of which is incorporated in its entirety herein by reference thereto. A particular example of oil management in systems having multiple compressors is disclosed in U.S. Pat. No. 4,729,228 (Suction Line Flow Stream Separator For Parallel Compressor Arrangements), the teachings and disclosure of which is incorporated in its entirety herein by reference thereto.

Additionally, oil distribution systems for multiple-compressor arrangements are disclosed in U.S. Patent Pub. No. 2014/0056725, published Feb. 27, 2014; U.S. Patent Pub. No. 2014/0037483, published Feb. 6, 2014; and U.S. Patent Pub. No. 2014/0037484, published Feb. 6, 2014, each of which is assigned to the assignee of the present application. The teachings and disclosures of these publications are incorporated in their entireties herein by reference thereto.

For example, when distributing oil from one compressor to another in a refrigeration system having multiple compressors, the amount of oil distributed is at least partly dependent on the oil available to be drawn into the opening of an oil-supplying compressor such that the oil can then be distributed to one or more downstream oil-receiving compressors in the refrigeration system. It is also dependent on the oil sump pressures in the compressors.

Embodiments of the invention provide an advancement over the state of the art with respect to oil distribution in multiple-compressor systems. These and other advantages of the invention, as well as additional inventive features, will be apparent from the description of the invention provided herein.

BRIEF SUMMARY OF THE INVENTION

In one aspect, embodiments of the invention provide a method of operating a multiple-compressor refrigeration system. This method includes the steps of supplying, via a common supply line, refrigerant gas and oil to a plurality of compressors coupled in series, and attaching an oil flow conduit between adjacent compressors of the plurality of compressors. The oil flow conduit is configured to move oil from a compressor with a relatively higher pressure to a compressor with a relatively lower pressure. The method further includes controlling the pressure for each of the plurality of compressors by regulating a speed at which each of the plurality of compressors operates in order to maintain a pressure differential between the adjacent compressors to facilitate the flow of oil from the compressor with the relatively higher pressure to the compressor with the relatively lower pressure.

In a particular embodiment, controlling the pressure for each of the plurality of compressors by regulating a speed at which each of the plurality of compressors operates includes attaching each of the plurality of compressors to a refrigeration system controller. Also, supplying refrigerant gas and oil to a plurality of compressors coupled in series may include supplying refrigerant gas and oil to a lead compressor and to one or more non-lead compressors located downstream of the lead compressor. In certain embodiments, at least one of the one or more non-lead compressors has a greater pumping capacity than the lead compressor. Further, in some embodiments, a first non-lead compressor is located immediately downstream of the lead compressor, the first non-lead compressor having a greater pumping capacity than the lead compressor, and wherein a second non-lead compressor is located immediately downstream of the first non-lead compressor, the second non-lead compressor having a greater pumping capacity than the first non-lead compressor.

Additionally, each of the plurality of compressors may have the same pumping capacity. Also, supplying refrigerant gas and oil to a plurality of compressors may require supplying refrigerant gas and oil to a plurality of compressors via a corresponding plurality of inlet supply lines. In some embodiments, at least one of the plurality of inlet supply lines includes a flow restriction located on an interior portion of the at least one of the plurality of inlet supply lines. In other embodiments, at least one of the plurality of inlet supply lines includes a portion that protrudes into the common supply line to restrict a flow of refrigerant gas and oil into the at least one of the plurality of inlet supply lines. The plurality of inlet supply lines may be arranged to supply more oil to a lead compressor than is supplied to one or more non-lead compressors located downstream of the lead compressor.

In further embodiments of the method, each of the plurality of inlet supply lines is sized to create a pressure differential between adjacent compressors of the plurality of compressors, and the sizes of the plurality of inlet supply lines are configured to produce a higher pressure in the lead compressor than in the non-lead compressors.

In another aspect, embodiments of the invention provide a refrigeration system with a plurality of compressors connected in series with each other. Each compressor has an oil sump located in a gravitational bottom of the compressor, and one or more oil flow conduits coupled between adjacent compressors of the plurality of compressors. The oil flow conduits are configured to facilitate a distribution of oil from an upstream compressor to a downstream compressor. A common supply line supplies refrigerant and oil to each of the plurality of compressors. The plurality of compressors includes a lead compressor and one or more non-lead compressors. The common supply line is configured to return more oil to the lead compressor than to the one or more non-lead compressors. A controller is coupled to each of the plurality of compressors. The controller regulates the speed of each of the plurality of compressors to control oil sump pressures for each of the plurality of compressors such that the lead compressor has a higher oil sump pressure than any of the one or more non-lead compressors in order to facilitate oil distribution from the lead compressor to the one or more non-lead compressors.

In a particular embodiment, the plurality of compressors includes the lead compressor being located upstream from a first non-lead compressor. The controller is configured to operate the lead compressor at a slower speed than the first non-lead compressor in order to maintain the higher pressure in the lead compressor. In some embodiments, the lead compressor and first non-lead compressor has the same pumping capacity. In other embodiments, the first non-lead compressor has a greater pumping capacity than the lead compressor. Furthermore, a second non-lead compressor may be coupled to, and downstream of, the first non-lead compressor.

In certain embodiments, the plurality of compressors comprises a second non-lead compressor coupled to, and downstream of, the first non-lead compressor, and wherein the controller is configured to operate the lead compressor at a slower speed that the first non-lead compressor in order to maintain the higher pressure in the lead compressor. Further, each of the plurality of compressors may have an inlet supply line to supply refrigerant and gas from the common supply line. In a particular embodiment, at least one inlet supply line includes one of: a portion that protrudes into the common supply line to restrict a flow of refrigerant gas and oil into the at least one inlet supply line; and a flow restriction located on an interior portion of the at least one inlet supply line.

In a further embodiment, each of the inlet supply lines is sized to create a pressure differential between adjacent compressors of the plurality of compressors, and the sizes of the inlet supply lines are configured to produce a higher pressure in the lead compressor than in the non-lead compressors.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

The following detailed description describes embodiments of the invention as applied in a multi-compressor refrigeration system. However, one of ordinary skill in the art will recognize that the invention is not necessarily limited to refrigeration systems. Embodiments of the invention may also find use in other systems where multiple compressors are used to supply a flow of compressed gas. It should also be noted that, for the sake of convenience, certain embodiments of the invention may be described hereinbelow with respect to their application in systems having multiple scroll compressors for compressing refrigerant. While particular advantages and configurations are shown for scroll compressors, Applicants submit that the scope of the invention is not necessarily limited to scroll compressors, but may find use in a variety of multiple-compressor systems using compressor types other than scroll compressors.

In the context of this application, the terms "upstream" and "downstream" are used to refer to various compressors in relation to the flow of oil between the compressors. For example, in the embodiments of refrigeration systems described hereinbelow, the lead compressor receives most of the oil in the circulated refrigerant. As such, in the embodiments presented, the lead compressor is the most upstream of the compressors. Oil flows downstream from the lead compressor to the nearest, or adjacent, non-lead compressor. If the system has a third compressor, oil flows downstream, from the aforementioned non-lead compressor nearest the lead compressor, to the next non-lead compressor.

In multiple-compressor systems in which oil is distributed between compressors, the system may rely on pressure differentials between the compressors to move the oil, for example from a lead compressor to one or more non-lead compressors. In certain system arrangements, the pressure differential provides the driving force for the movement of oil between compressors. There are several factors which may affect the pressure in a given compressor. For example, the size of the inlet piping feeding oil to the compressor affects pressure. Additionally, as will be explained below, pressure can also be affected by the pumping capacity of the compressors.

Figure 1:
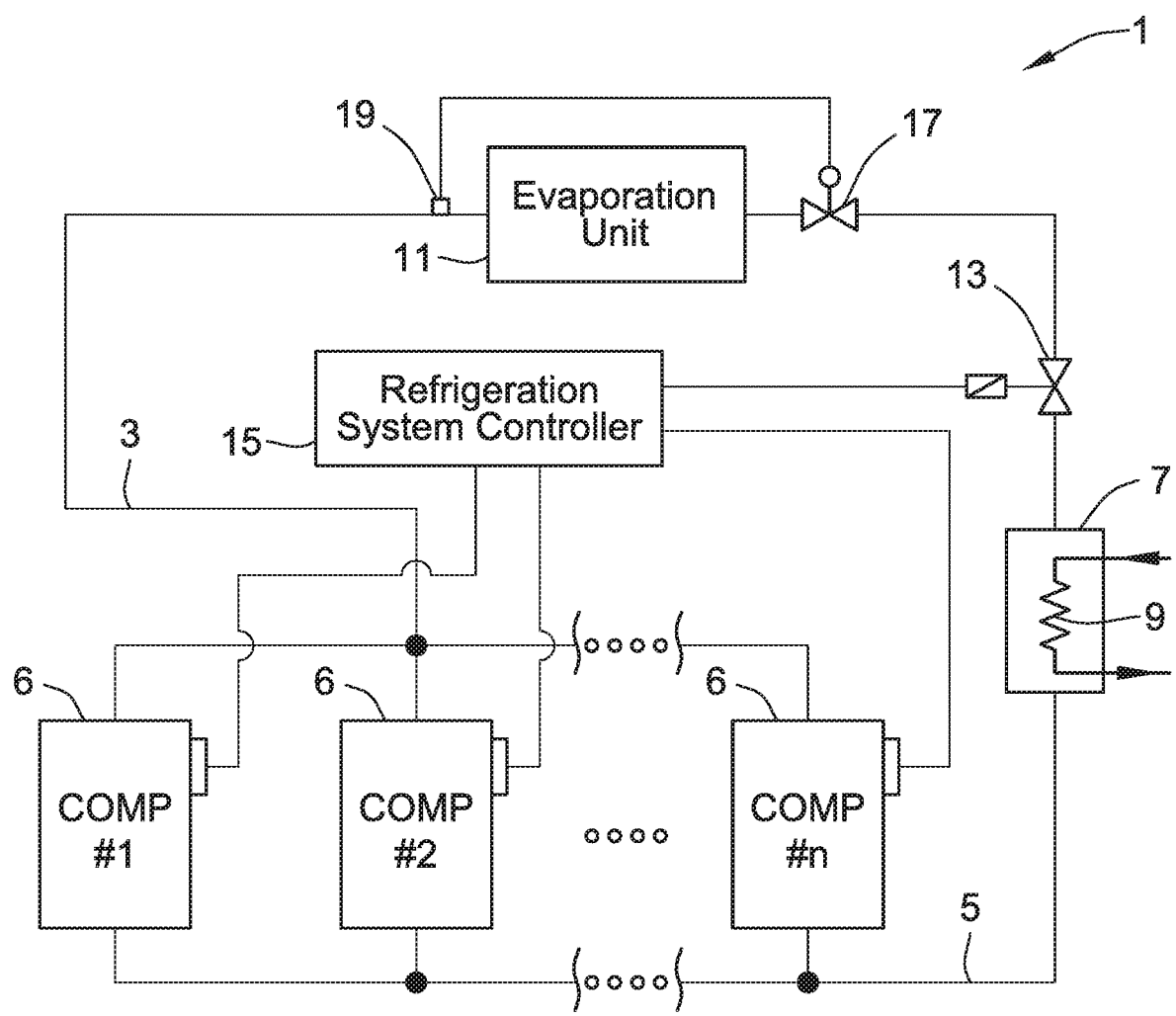
FIG. 1 is a block diagram of a multi-compressor refrigeration system, constructed in accordance with an embodiment of the invention.

FIG. 1 provides a schematic illustration of an exemplary multiple-compressor refrigeration system 1 having a plurality of N compressors 6. The N compressors 6 of refrigeration system 1 are connected in a parallel circuit having inlet flow line 3 that supplies a flow of refrigerant to the N compressors 6, and outlet flow line 5 that carries compressed refrigerant away from the N compressors 6. In certain embodiments, the flow of refrigerant carries oil entrained within the flow, the oil used to lubricate moving parts of the compressor 6. As shown, the outlet flow line 5 supplies a condenser 7. In a particular embodiment, the condenser 7 includes a fluid flow heat exchanger 9 (e.g. air or a liquid coolant) which provides a flow across the condenser 7 to cool and thereby condense the compressed, high-pressure refrigerant.

An evaporation unit 11 to provide cooling is also arranged in fluid series downstream of the condenser 7. In an alternate embodiment, the condenser 7 may feed multiple evaporation units arranged in parallel. In the embodiment of FIG. 1, the evaporation unit 11 includes a shut off liquid valve 13, which, in some embodiments, is controlled by the refrigeration system controller 15 to allow for operation of the evaporation unit 11 to produce cooling when necessitated by a demand load on the refrigeration system 1, or to preclude operation of the evaporation unit 11 when there is no such demand. As shown in FIG. 1, the refrigeration system controller 15 may also be directly connected to each of the N compressors 6. The refrigeration system controller 15 may be configured to independently control each of the N compressors 6. Specifically, the refrigeration system controller 15 may be configured to turn compressors 6 on or off, or independently control the speed of each compressor 6 during operation.

The evaporation unit 11 also includes an expansion valve 17 that may be responsive to, or in part controlled by, a downstream pressure of the evaporation unit 11, sensed at location 19. The expansion valve 17 is configured to control the discharge of refrigerant into the evaporation unit 11, wherein due to the evaporation, heat is absorbed to evaporate the refrigerant to a gaseous state thereby creating a cooling/refrigeration effect at the evaporation unit 11. The evaporation unit 11 returns the expanded refrigerant in a gaseous state along the inlet flow line 3 to the bank of N compressors 6.

Figure 2:
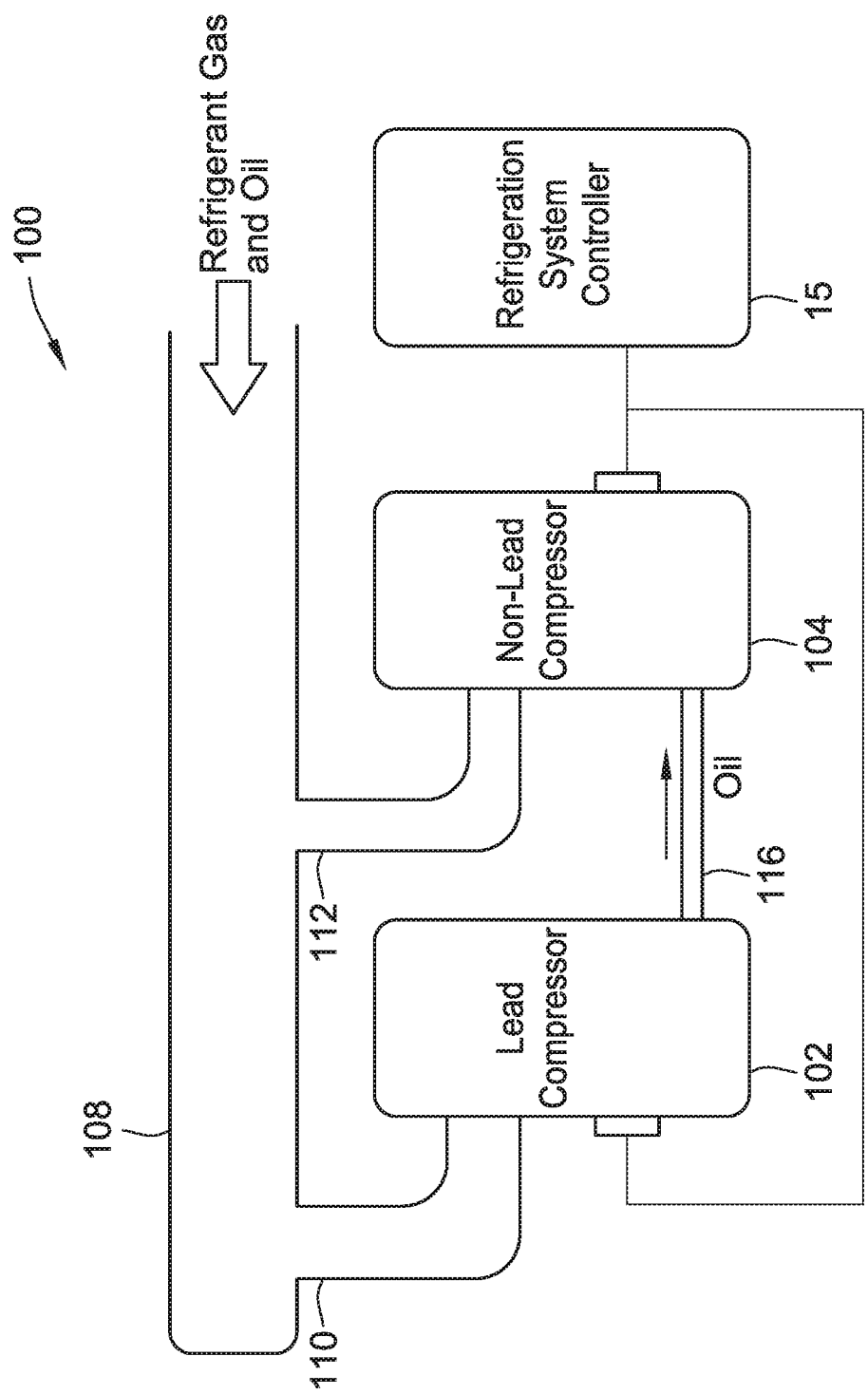
FIG. 2 is a schematic diagram of an exemplary multiple-compressor refrigeration system, constructed in accordance with an embodiment of the invention.

FIG. 2 illustrates an alternate embodiment of a refrigeration system 100 in which compressor speed is controlled by refrigeration system controller 15 in such a manner as to create sequentially-decreasing pressures from one compressor to the next in order to facilitate the distribution of oil from compressors with relatively higher oil sump pressures to those with relatively lower oil sump pressures. FIG. 2 is a schematic view of the refrigeration system 100 which includes lead compressor 102 connected in series with non-lead compressor 104. In this embodiment, the two compressors 102, 104 have the same pumping capacity. For the sake of simplicity, the embodiment of FIG. 2 shows only two compressors, however, it should be understood that the scope of the invention allows for the use of more than two compressors in accordance with the general system arrangement shown in FIG. 2.

Refrigerant gas is supplied to the two compressors 102, 104 via a common supply line 108. Oil entrained in the refrigerant gas is also returned to the two compressors 102, 104. A first inlet supply line 110 carries refrigerant and oil to the lead compressor 102, while a second inlet supply line 112 carries refrigerant and oil to the non-lead compressor 104. In the embodiment of FIG. 2, first inlet supply line 110 and the second inlet supply line 112 intersect the common supply line 108 at a gravitational bottom of the common supply line 108, where the common supply line 108 runs horizontally. In alternate embodiment, the inlet supply lines may intersect with the common supply line 108 at locations other than the gravitational bottom.

Oil is distributed from the lead compressor 102 to the non-lead compressor 104 via oil flow conduit 116. The oil flow conduit 116 is attached to a lower portion of each of the two compressors 102, 104, for example to a fitting attached to the compressor housings proximate the oil sump of each compressor 102, 104. In some of the embodiments disclosed herein, the systems are designed to return more oil to the lead compressor 102 than to any of the non-lead compressors.

In the embodiment of FIG. 2, the first inlet supply line 110 for the lead compressor 102 is larger than the second inlet supply line 112 for the non-lead compressor 104. In this case, the larger size of the first inlet supply line 110 allows for a greater pressure of refrigerant gas and oil into the lead compressor 102 than to non-lead compressor 104. Successively smaller input supply lines could be attached to the non-lead compressors located downstream from the lead compressor 102. These smaller input supply lines result in decreasing pressures in each successive compressor. Other piping means could be used to achieve a similar effect with respect to the pressure in the various compressors. For example, the system 100 could have multiple compressors with inlet supply lines of the same size where the flow into the inlet supply lines is limited by restrictions placed inside of the inlet supply lines. The greater the restriction, the lower the pressure in the respective compressor. As will be shown below, flows into the inlet supply lines can also be restricted by having the inlet supply line protrude into the interior of the common supply line 108.

As stated above, the pressure in the two compressors 102, 104 are also affected by the pumping capacity of the compressors. Thus, in particular embodiments of the invention, the refrigeration system controller 15 (shown in FIG. 1) controls the compressor speed to maintain the desired pressure for controlling the flow of oil from the lead compressor 102 to the non-lead compressor 104. Increasing the speed of the non-lead compressor 104 increases its pressure drop thereby lowering the pressure in that compressor and increasing the amount of oil it receives from the lead compressor 102. Alternatively, decreasing the speed of the lead compressor 102 reduces its pressure drop thereby raising the pressure in that compressor and increasing the amount of oil it supplies to the non-lead compressor 104.

When used in conjunction with inlet supply line arrangements such as shown in FIG. 2, there is some added flexibility with respect to the aforementioned control of compressor speed to maintain the desired pressure differential to facilitate a flow of oil from the lead compressor 102. For example, with the inlet supply line arrangement of FIG. 2, it may be possible to operate the lead compressor 102 at the same speed, or even a higher speed, than the non-lead compressor 104 while maintaining the desired pressure differential.

Figure 3:
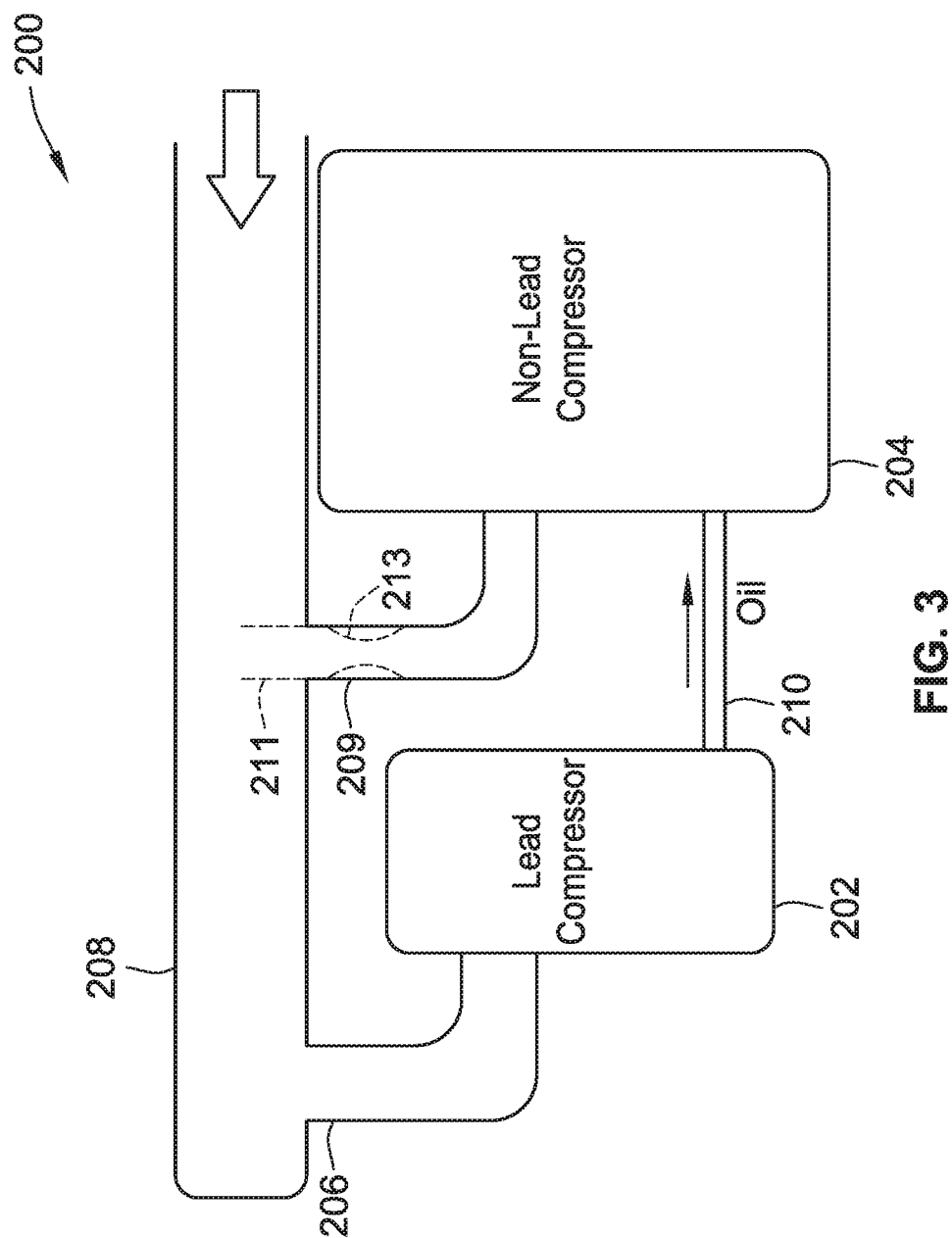
FIG. 3 is a schematic diagram of another exemplary multiple-compressor refrigeration system, constructed in accordance with an embodiment of the invention.

FIG. 3 illustrates an alternate embodiment of a refrigeration system 200 in which compressor speed is controlled in such a manner as to create sequentially-decreasing pressures from one compressor to the next in order to facilitate the distribution of oil from compressors with relatively higher oil sump pressures to those with relatively lower oil sump pressures. The refrigeration system 200 has a lead compressor 202 coupled in series with a non-lead compressor 204. A common supply line 208 provides refrigerant gas and oil to the lead compressor 202 via a first inlet supply line 206, and to the non-lead compressor 204 via second inlet supply line 209. Oil is distributed from the lead compressor 202 to the non-lead compressor 204 via oil flow conduit 210. The oil flow conduit 210 is attached to a lower portion of each of the two compressors 202, 204, for example to a fitting attached to the compressor housings proximate the oil sump of each compressor 202, 204.

In the embodiment of FIG. 3, the first inlet supply lines 206, 209 are of equal size. However, the second inlet supply line 209 has an optional portion 211 (shown in broken lines) that protrudes into an interior portion of the common supply line 208. This protruding portion 211, which is oriented perpendicular to the flow of refrigerant and oil, reduces the flow of both into the non-lead compressor 204 reducing the pressure in that compressor. The larger capacity and lower oil sump pressure of non-lead compressor 204 facilitates a flow of oil from the lead compressor to non-lead compressor 204 through oil distribution line 210, which is connected to lower portions of the lead and non-lead compressors 202, 204. Alternatively, instead of optional protruding portion 211, an optional restriction 213 could be used in an interior portion of second inlet supply line 209 to effectively reduce the inner diameter of the second inlet supply line 209, thereby reducing the flow of refrigerant and oil into non-lead compressor 204, which results in a lower pressure in this compressor.

However, with or without the restriction 213 or the protruding portion 211 of the second inlet supply line 209, the flow of oil from the lead compressor 202 to the non-lead compressor 204 can be controlled by regulating the speed, or pump capacity, of the two compressors 202, 204. In the configuration of FIG. 3, the non-lead compressor 204 compressor is shown as larger than lead compressor 202, indicating its greater pumping capacity than the lead compressor 202. For example, if the two compressors 202, 204 are scroll compressors, non-lead compressor 204 would have larger scroll compressor bodies, i.e., designed to compress more refrigerant in a given time period than the compressor bodies of the lead compressor 202. The non-lead compressor 204 would also have a larger drive unit, and a larger compressor housing than the lead compressor 202. Therefore, all things being equal, the larger-capacity non-lead compressor 204 would normally have a lower oil sump pressure than the lead compressor 202. Thus, the non-lead compressor 204 could be run at the same speed, or even a lower speed, than the lead compressor 202 while still maintaining a pressure differential sufficient to drive oil from the lead compressor 202 to the non-lead compressor 204. The use of portion 211 of second inlet supply line 209 allows even more flexibility in controlling the speeds of the two compressors 202, 204 while still maintaining a pressure differential sufficient for oil distribution from the lead compressor 202 to the non-lead compressor 204.

Figure 4:
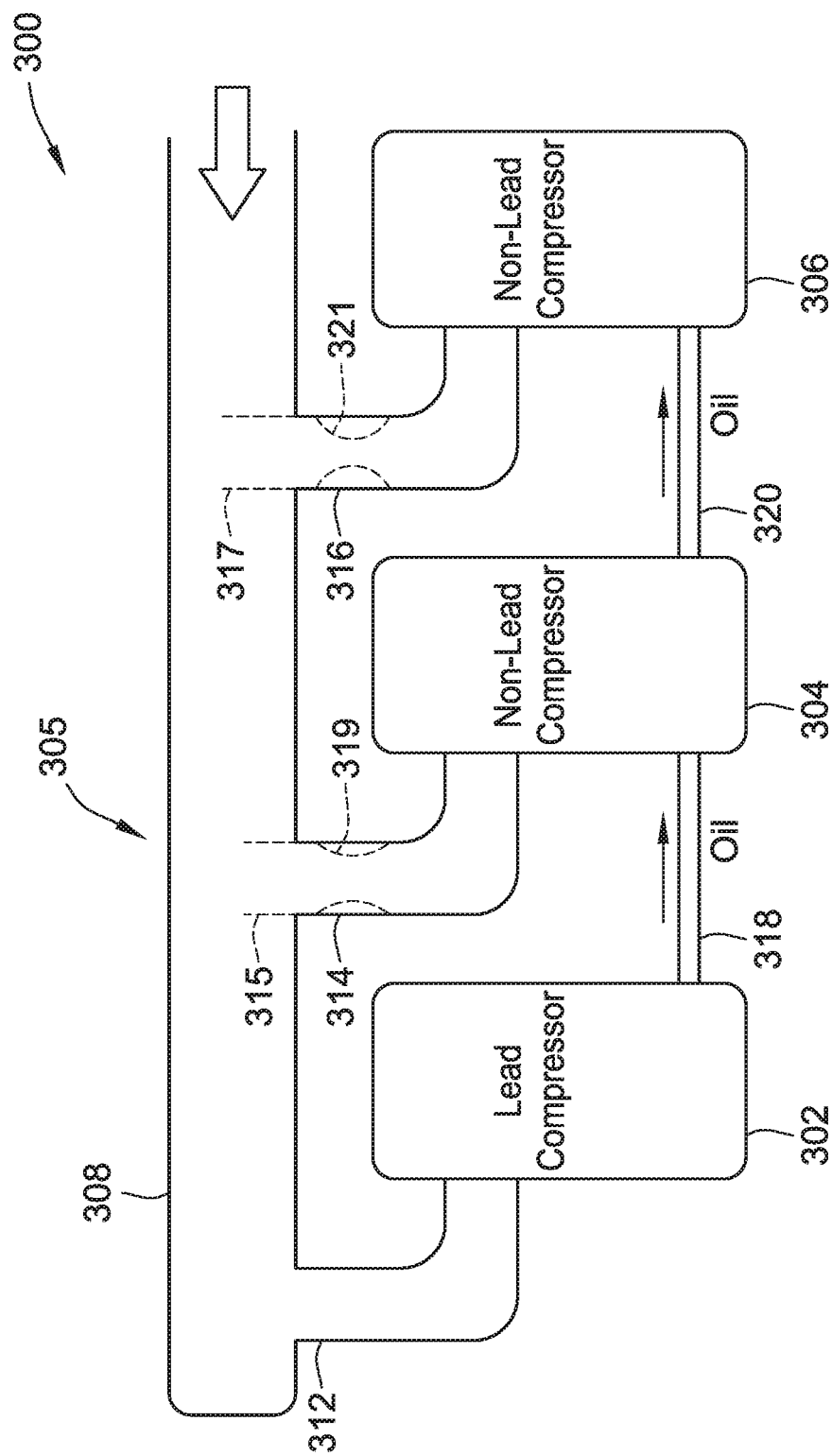
FIG. 4 is a schematic diagram of yet another exemplary multiple-compressor refrigeration system, constructed in accordance with an embodiment of the invention.

FIG. 4 is a schematic diagram showing a multiple-compressor refrigeration system 300, according to an embodiment of the invention. Refrigeration system 300 includes lead compressor 302 connected in series with first non-lead compressor 304, which is, in turn, connected in series to second non-lead compressor 306. In the arrangements shown in FIG. 4, as in the embodiments described above, the series connections indicates that, regardless of the number of compressors in the system, oil can only flow from an upstream compressor to the next adjacent compressor immediately downstream.

In the embodiment of FIG. 4, in which the multi-compressor system 300 includes second non-lead compressor 306 downstream from the first non-lead compressor 304, the first non-lead compressor 304, having a pressure higher than that of the second non-lead compressor 306, distributes oil downstream to second non-lead compressor 306 through a second oil flow conduit 320. The first non-lead compressor 304 receives oil from the lead compressor 302 via first oil flow conduit 318. This process can be repeated for however many compressors make up the multi-compressor system 300, where the cascading pressure differential between the compressors allows oil to flow from the lead compressor 302 downstream to non-lead compressors. Thus, the multiple series-connected compressors distribute oil from the upstream-most compressor sequentially downstream to compressors with progressively lower oil sump pressures. While this design does require adjacent compressors to be running, it will be shown below that there are several different ways of achieving this cascading effect.

The refrigeration system 300 further includes a suction header arrangement 305 that includes a common supply line 308, a first inlet supply line 312 coupling the lead compressor 302 to the common supply line 308, a second inlet supply line 314 coupling the first non-lead compressor 304 to the common supply line 308, and a third inlet supply line 316 coupling the second non-lead compressor 306 to the common supply line 308.

In the embodiment shown, lead inlet supply line 312, the first inlet supply line 314, and the second inlet supply line 316 intersect the common supply line 308 at a gravitational bottom of the common supply line 308 where the common supply line 308 runs horizontally. A number of suction header arrangements 305 may be used to help achieve the cascading pressures described above. Optional first and second protruding portions 315, 317 (shown in broken lines) of the second and third inlet supply lines 314, 316, respectively, restrict the flow of refrigerant and oil into those inlet supply lines 314, 316. Alternatively, optional first and second restrictions 319, 321 (shown in broken lines) of the second and third inlet supply lines 314, 316, respectively, restrict the flow of refrigerant and oil into those inlet supply lines 314, 316. As can be seen from FIG. 4, the second protruding portion 317 protrudes farther into the common supply line 308 than the first protruding portion 315. As a result, the second non-lead compressor 306 will have a lower sump pressure than the first non-lead compressor 304, which will have lower sump pressure than lead compressor 302. Similarly, it can be seen that the second restriction 321 restricts flow more than first restriction 319, which achieves the same result as the first and second protruding portions 315, 317 in terms of refrigerant and oil flow to the three compressors 302, 304, 306.

Therefore, in the embodiment of FIG. 4, while all three compressors 302, 304, 306 receive a flow of refrigerant gas, having oil entrained therein, from a common supply line 308, the common supply line 308 delivers more lubricating oil to the lead compressor 302, via the first inlet supply line 312. However, with or without the optional first and second restrictions 319, 321 or the optional first and second protruding portions 315, 317, the flow of oil from the lead compressor 302 to the first non-lead compressor 304, and from that compressor to the second non-lead compressor 306, can be controlled by regulating the speed, or pump capacity, of the three compressors 302, 304, 306.

As explained above, the refrigeration system controller 15 (shown in FIG. 1) can run the first non-lead compressor 304 at a faster speed than the lead compressor 302 to create a desired pressure differential between those two compressors 302, 304. Further, the refrigeration system controller 15 can run the second non-lead compressor 306 at a faster speed than the first non-lead compressor 304 to create a desired pressure differential between those two compressors 304, 306. Thus, by controlling the compressor speeds and, therefore, the pressures in those compressors 302, 304, 306, oil can be distributed among the compressors 302, 304, 306. However, as in the embodiments above, the arrangement of the inlet supply lines provides flexibility with respect to how compressor speed can be controlled while maintaining the desired pressure differentials.

In the embodiment of FIG. 4, the three compressors 302, 304, 306 are the same size and pumping capacity. However, as in FIG. 3, the first non-lead compressor 304 could be larger than the lead compressor 302. The second non-lead compressor 306 could be larger or smaller than the first non-lead compressor 304. If the compressor size and pumping capacity increases sequentially downstream from the lead compressor 302, then the pressure differentials could be maintained even if all compressors were run at the same speed, or even if the lead compressor 302 is run at a faster speed than the non-lead compressors 304, 306.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of operating a multiple-compressor refrigeration system comprising the steps of:
    supplying, via a common supply line, refrigerant gas and oil to a plurality of compressors coupled in series;
    attaching an oil flow conduit between adjacent compressors of the plurality of compressors, the oil flow conduit configured to move oil from a compressor with a relatively higher pressure to a compressor with a relatively lower pressure;
    controlling the pressure for each of the plurality of compressors by regulating a speed at which each of the plurality of compressors operates in order to maintain a pressure differential between the adjacent compressors to facilitate the flow of oil from the compressor with the relatively higher pressure to the compressor with the relatively lower pressure.

2. The method of claim 1, wherein controlling the pressure for each of the plurality of compressors by regulating a speed at which each of the plurality of compressors operates comprises attaching each of the plurality of compressors to a refrigeration system controller.

3. The method of claim 1, wherein supplying refrigerant gas and oil to a plurality of compressors coupled in series comprises supplying refrigerant gas and oil to a lead compressor and to one or more non-lead compressors located downstream of the lead compressor.

4. The method of claim 3, wherein at least one of the one or more non-lead compressors has a greater pumping capacity than the lead compressor.

5. The method of claim 4, wherein a first non-lead compressor is located immediately downstream of the lead compressor, the first non-lead compressor having a greater pumping capacity than the lead compressor, and wherein a second non-lead compressor is located immediately downstream of the first non-lead compressor, the second non-lead compressor having a greater pumping capacity than the first non-lead compressor.

6. The method of claim 1, wherein each of the plurality of compressors has the same pumping capacity.

7. The method of claim 1, wherein supplying refrigerant gas and oil to a plurality of compressors comprises supplying refrigerant gas and oil to a plurality of compressors via a corresponding plurality of inlet supply lines.

8. The method of claim 7, wherein at least one of the plurality of inlet supply lines includes a flow restriction located on an interior portion of the at least one of the plurality of inlet supply lines.

9. The method of claim 7, wherein at least one of the plurality of inlet supply lines includes a portion that protrudes into the common supply line to restrict a flow of refrigerant gas and oil into the at least one of the plurality of inlet supply lines.

10. The method of claim 7, wherein the plurality of inlet supply lines is arranged to supply more oil to a lead compressor than is supplied to one or more non-lead compressors located downstream of the lead compressor.

11. The method of claim 10, wherein each of the plurality of inlet supply lines is sized to create a pressure differential between adjacent compressors of the plurality of compressors, wherein the sizes of the plurality of inlet supply lines are configured to produce a higher pressure in the lead compressor than in the non-lead compressors.

12. A refrigeration system comprising:
    a plurality of compressors connected in series with each other, each compressor having an oil sump located in a gravitational bottom of the compressor, and having one or more oil flow conduits coupled between adjacent compressors of the plurality of compressors, the oil flow conduits configured to facilitate a distribution of oil from an upstream compressor to a downstream compressor;
    a common supply line for supplying refrigerant and oil to each of the plurality of compressors;
    wherein the plurality of compressors includes a lead compressor and one or more non-lead compressors, and wherein the common supply line is configured to return more oil to the lead compressor than to the one or more non-lead compressors; and
    a controller coupled to each of the plurality of compressors;
    wherein the controller regulates the speed of each of the plurality of compressors to control oil sump pressures for each of the plurality of compressors such that the lead compressor has a higher oil sump pressure than any of the one or more non-lead compressors in order to facilitate oil distribution from the lead compressor to the one or more non-lead compressors.

13. The refrigeration system of claim 12, wherein the plurality of compressors comprises the lead compressor located upstream from a first non-lead compressor, and wherein the controller is configured to operate the lead compressor at a slower speed than the first non-lead compressor in order to maintain the higher pressure in the lead compressor.

14. The refrigeration system of claim 13, wherein the lead compressor and first non-lead compressor having the same pumping capacity.

15. The refrigeration system of claim 13, wherein the first non-lead compressor has a greater pumping capacity than the lead compressor.

16. The refrigeration system of claim 15, wherein a second non-lead compressor is coupled to, and downstream of, the first non-lead compressor.

17. The refrigeration system of claim 12, wherein the plurality of compressors comprises a second non-lead compressor coupled to, and downstream of, the first non-lead compressor, and wherein the controller is configured to operate the lead compressor at a slower speed that the first non-lead compressor in order to maintain the higher pressure in the lead compressor.

18. The refrigeration system of claim 12, wherein each of the plurality of compressors has an inlet supply line to supply refrigerant and gas from the common supply line.

19. The refrigeration system of claim 18, wherein at least one inlet supply line includes one of:
   a portion that protrudes into the common supply line to restrict a flow of refrigerant gas and oil into the at least one inlet supply line; and
   a flow restriction located on an interior portion of the at least one inlet supply line.

20. The refrigeration system of claim 18, wherein each of the inlet supply lines is sized to create a pressure differential between adjacent compressors of the plurality of compressors, wherein the sizes of the inlet supply lines are configured to produce a higher pressure in the lead compressor than in the non-lead compressors.

\* \* \* \* \*